United States Patent [19]

Iwasa et al.

[11] Patent Number: 5,694,810
[45] Date of Patent: Dec. 9, 1997

[54] RACK AND PINION STEERING DEVICE

[75] Inventors: Soichi Iwasa, Nara; Yasuaki Tsuji, Osaka; Toru Hashimoto, Osaka; Kouji Kitahata, Osaka; Hiroshi Ueno, Osaka, all of Japan

[73] Assignee: Koyo Seiko Co., Ltd., Osaka, Japan

[21] Appl. No.: 644,725

[22] Filed: May 10, 1996

Related U.S. Application Data

[63] Continuation of Ser. No. 253,157, Jun. 2, 1994, abandoned.

[30] Foreign Application Priority Data

Jun. 2, 1993 [JP] Japan ............... 5-035162 U

[51] Int. Cl.$^6$ ....................................... B62D 5/22
[52] U.S. Cl. ................. 74/422; 74/109; 74/498
[58] Field of Search ............ 74/422, 498, 89.11, 74/109

[56] References Cited

U.S. PATENT DOCUMENTS

| | | | |
|---|---|---|---|
| 4,218,933 | 8/1980 | Allen et al. | 74/422 |
| 4,663,980 | 5/1987 | Narita | 74/422 |
| 5,025,675 | 6/1991 | Guasch | 74/422 |

FOREIGN PATENT DOCUMENTS

| | | |
|---|---|---|
| 62-121168 | 7/1987 | Japan . |
| 93 09991 | 5/1993 | WIPO . |

Primary Examiner—Charles A. Marmor
Assistant Examiner—David M. Fenstermacher
Attorney, Agent, or Firm—Reid & Priest LLP

[57] ABSTRACT

An annular stopper (22) made of synthetic resin is inserted into a housing (5). The housing (5) contains a rack (4) meshing with a pinion which rotates according to steering operation. A reaction force acts on the stopper (22) so that the inward movement of the stopper (22) into the housing (5) is restrained. At least part of the reaction force acts on an end face (22c) of the stopper (22) when the stopper (22) restrains the rack (4) from moving into one direction.

3 Claims, 9 Drawing Sheets

RACK AND PINION STEERING DEVICE

This application is a continuation of Ser. No. 08/253,157, filed Jun. 2, 1994, now abandoned.

FIELD OF THE INVENTION

The present invention relates to a rack and pinion steering device having a stopper for restraining the movement of the rack.

DESCRIPTION OF THE RELATED ARTS

FIG. 22 shows a part of a conventional hydraulic power steering device. The steering device comprises a rack 101 in mesh with a pinion that rotates according to steering operation, a housing 102 containing the rack 101, a bushing 104 for sealing one end of an oil chamber 103 formed in the housing 102, and an annular stopper 105 which is inserted into the housing 102 so as to be positioned external to the bushing 104. Hydraulic oil fed into the oil chamber 103 for generating steering assist force exerts oil pressure on the bushing 104 to direct the bushing 104 to the outward direction from the housing 102. The outward movement of the busing 104 from the housing 102 caused by the oil pressure is restrained by the stopper 105. A member such as a ball joint is integrated with the rack 101 so as to be positioned external to the housing 102. The member integrated with the rack 101 is contacted with the stopper 105 so that the stopper 105 can restrain the rack 101 from moving into one direction (into the right in the FIG. 22), and thus the stroke of the rack 101 into the one direction is controlled to a settled range. There is a clearance t between the bushing 104 and the stopper 105 to assure tolerance for assembly.

The stopper 105 is conventionally made of sintered metals. To restrain the movement of the stopper 105, a ring member 106 such as a cir-clip is fitted in both of a circumferential groove 102a formed on the inner circumference of the housing 102 and a circumferential groove 105a formed on the outer circumference of the stopper 105. Via the ring member 106, a reaction force, which restrains the stopper 105 from moving outwardly from the housing 102, and a reaction force, which restrains the stopper 105 from moving inwardly into the housing 102, act on the circumferential groove 105a of the stopper 105. Thereby, the stopper 105 can restrain the bushing 104 from moving outwardly from the housing and can restrain the member such as a ball joint integrated with the rack 101 from moving inwardly into the housing.

The sintered metal is heavy and costly as the material of the stopper 105. Accordingly, it is required that a stopper made of synthetic resin is applied to achieve light weight and low cost.

However, the movement of the rack 101 into the one direction is restrained only by the engagement between the ring member 106 and the circumferential groove 102a of the stopper 105. Therefore, if the stopper 105 is made of synthetic resin in the prior art, as shown in FIG. 23, there is a possibility to generate a crack 110 causing a fracture of the stopper 105 by deficiency of strength. Because, when for example a vehicle wheel runs over to a curb or the like, the member such as a ball joint integrated with the rack 101 hits the stopper 105 and all of the reaction force restraining the rack 101 from moving inwardly into the housing 102 acts on the circumferential groove 105a via the ring member 106, so that stress concentration on the circumferential groove 105a is increased.

It is an object of the present invention to provide a rack and pinion steering device which solves the above described problems.

SUMMARY OF THE INVENTION

The first aspect of a rack and pinion steering device according to the present invention comprises a rack meshing with a pinion which rotates according to steering operation, a housing containing the rack, an annular stopper made of synthetic resin, the stopper being inserted into the housing, and means for enabling a reaction force to act on the stopper so that the inward movement of the stopper into the housing is restrained, wherein at least part of the reaction force acts on an end face of the stopper when the stopper restrains the rack from moving into one direction. According to this constitution of the present invention, since the stopper is made of synthetic resin, the stopper is light in weight and low in cost. Further, at least part of the reaction force restraining the rack from moving into the one direction acts on the end face of the stopper, thus fracture of the stopper is prevented, compared with the conventional case where all of the reaction force acts on the circumferential groove 105a formed on the outer circumference of the stopper 105 and stress concentration is increased at the circumferential groove 105a.

It is preferable a bushing supporting the rack is inserted into the housing, the stopper is inserted into the housing so as to be positioned external to the bushing, a step is formed on the inner circumference of the housing, a step is formed on the outer circumference of the bushing, the inward movement of the bushing into the housing is restrained by the engagement between both of the steps, and the stopper is restrained from moving inwardly into the housing via the bushing. By this arrangement, at least part of the reaction force restraining the rack from moving into the one direction acts on the end face of the stopper facing the bushing. Further, by utilizing the bushing for not only supporting the rack but also enabling the reaction force to act on the end face of the stopper, increase of components is avoided.

It is preferable that the bushing has a chamfer on its end face which faces the stopper, the stopper has a projection on its end face which faces the bushing, and the space between the chamfer and the housing is filled by the projection when the inward movement of the stopper into the housing is restrained via the bushing. By providing the chamfer, the bushing can be smoothly inserted into the housing and palled out from the housing. Further, by filling the projection into the space between the chamfer and the housing, the edge of the stopper is prevented from entering into the space by plastic deformation. Thus, fracture of the stopper based on the plastic deformation is avoided.

It is preferable that a ring member is engaged with both of the stopper and the housing to restrain the stopper from moving outwardly from the housing, and the stopper is allowed to move inwardly into the housing relative to the ring member. By this arrangement, the reaction force acting on the stopper to restrain the rack from moving into the one direction is prevented from acting via the ring member. so that fracture of the stopper is avoided.

It is preferable that a ring member is engaged with the housing, and the stopper has a portion, which is pressed by the ring member so as to deform elastically when the inward movement of the stopper into the housing is restrained. By the elastic deformation of the portion formed on the stopper, the reaction force restraining the rack from moving into the one direction is absorbed, and thus the fracture of the stopper is avoided.

It is preferable a ring member is engaged with both of the stopper and the housing to restrain the stopper from moving outwardly from the housing and inwardly into the housing, a retaining ring is fitted to the housing to restrain the stopper from moving inwardly into the housing, a circumferential groove is formed on the outer circumference of the stopper, and the width of the circumferential groove is set larger than the width of the ring member in the direction of the axis of the rack so that the ring member is engaged with the circumferential groove after the retaining ring is engaged with the end face of the stopper to restrain the stopper from moving inwardly into the housing. By this arrangement, the reaction force restraining the rack from moving into the one direction acts on not only the end face of the stopper but also the circumferential groove, and thus the reaction force acting on the stopper is distributed. Thereby, the fracture of the stopper is avoided. Furthermore, since the ring member is engaged with the circumferential groove after the retaining ring is engaged with the end face of the stopper, stress concentration at the groove is prevented from increasing.

DESCRIPTION OF PREFERRED EMBODIMENTS

Figure 6:
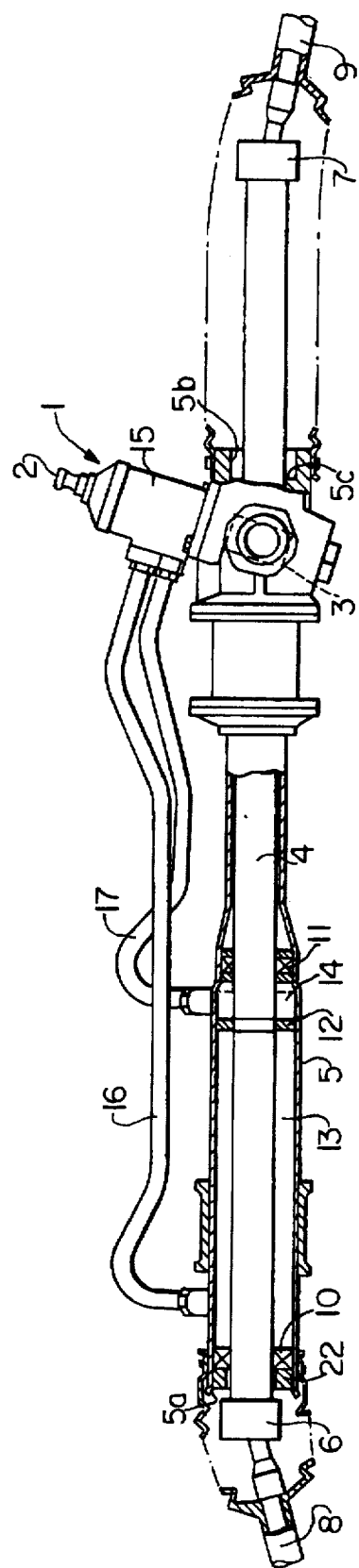
FIG. 6 is a cross-sectional view of the steering device.

A rack and pinion hydraulic power steering device 1 shown in FIG. 6 comprises an input shaft 2 connected to a steering wheel (omitted from the figure), a pinion 3 which rotates according to the rotation of the input shaft 2, a rack 4 in mesh with the pinion 3, and a housing 5 containing the rack 4. One end of the rack 4 is projected from an opening 5a formed on one end of the housing 5 and the other end of the rack 4 is projected from an opening 5b formed on the other end of the housing 5. A ball joint 6 is integrated with the one end of the rack 4 and a ball joint 7 is integrated with the other end of the rack 4. Each end of the rack 4 is connected to tie rods 8, 9 via the ball joints 6, 7, and each of the tie rods 8, 9 is connected to a vehicle wheel (omitted from the figure). The rotation of the input shaft 2 according to steering operation causes the pinion 3 to rotate, and the rotation of the pinion 3 causes the rack 4 to move into a transverse direction of the vehicle, so that the vehicle is steered.

A pair of seal members 10, 11, which seal between the inner circumference of the housing 5 and the outer circumference of the rack 4, are provided. A piston 12 is fixed to the rack 4 between the two seal members 10, 11. Thus, a pair of oil chambers 13, 14 partitioned by the piston 12 are formed between the two seal members 10, 11. A hydraulic control valve 15 is disposed around the input shaft 2. The hydraulic control valve 15 connects a hydraulic pump (omitted from the figure) to the oil chambers 13, 14 via piping 16, 17. Depending on direction of steering operation and resistance of steering operation, hydraulic oil is supplied to one of the oil chambers 13, 14 from a tank (omitted from the figure) and is fed back to the tank from the other of the oil chambers 13, 14 via the control valve 15. Oil pressure acting on the piston 12 based on the hydraulic oil fed to one of the oil chambers 13, 14 is transferred to the rack 4, so that steering assist force generates. The hydraulic control valve 15 may be of any conventional type.

Figure 1:
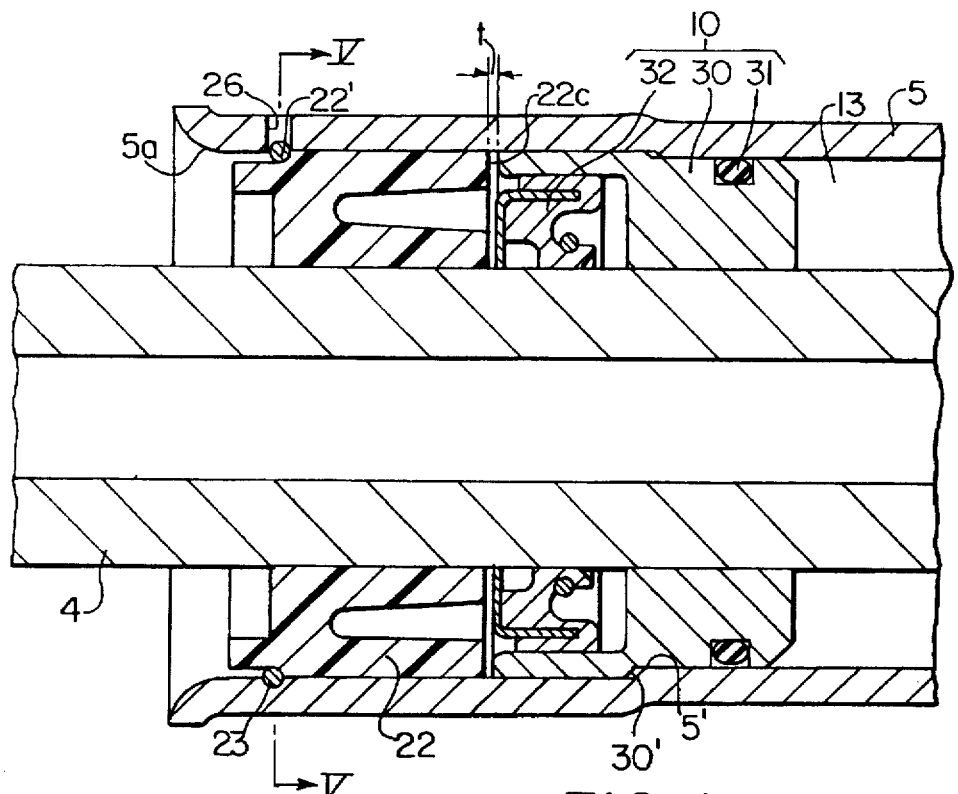
FIG. 1 is a cross-sectional view showing a stopper mounting portion of a steering device in an embodiment according to the present invention.

As shown in FIG. 1, the seal member 10, which seals one end of the oil chamber 13 in the vicinity of one 5a of the two openings 5a, 5b of the housing 5, has an annular rack bushing 30 inserted into the housing 5, an O-ring 31 fitted in a circumferential groove formed on the outer circumference of the bushing 30, and an oil seal 32 fitted in the circular recess formed on the inner and outward circumference of the bushing 30. The rack 4 is inserted into the bushing 30 so as to be supported by the inner circumference of the bushing 30. The O-ring 31 seals between the outer circumference of the bushing 30 and the inner circumference of the housing 5, and the oil seal 32 seals between the inner circumference of the bushing 30 and the outer circumference of the rack 4. A step 30' is formed on the outer circumference of the bushing 30. The outer diameter of the bushing 30 at its outward portion extending from the step 30' outwardly is larger than that of the bushing 30 at its inward portion extending from the step 30' inwardly. A step 5' is formed on the inner circumference of the housing 5. The inner diameter of the housing 5 at its outward portion extending from the step 5' outwardly is larger than that of the housing 5 at its inward portion extending from the step 5' inwardly. The engagement between both steps 5' and 30' restraints the inward movement of the bushing 30 into the housing 5.

Figure 2:
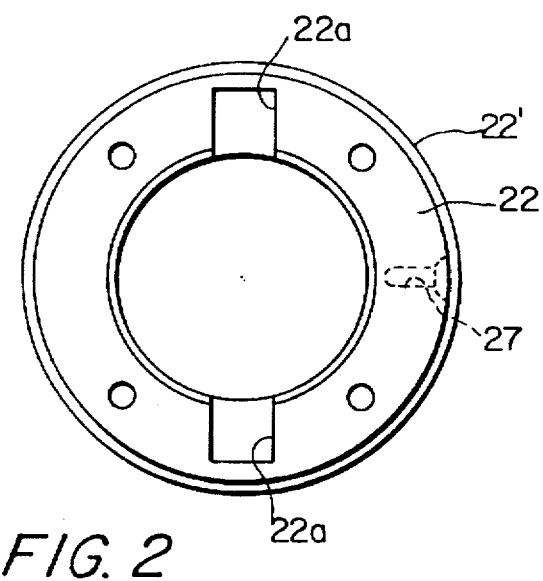
FIG. 2 is a front view of the stopper.
Figure 3:
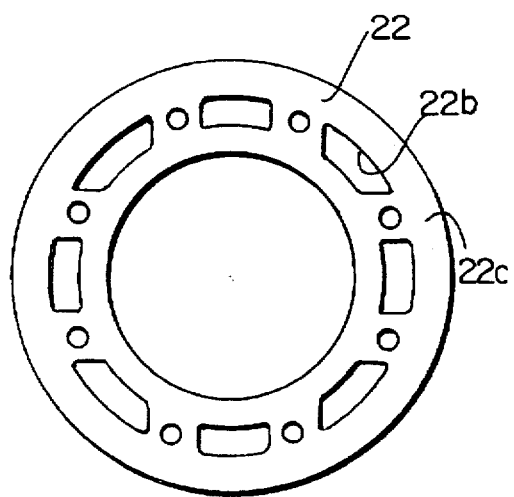
FIG. 3 is a rear view of the stopper.
Figure 5:
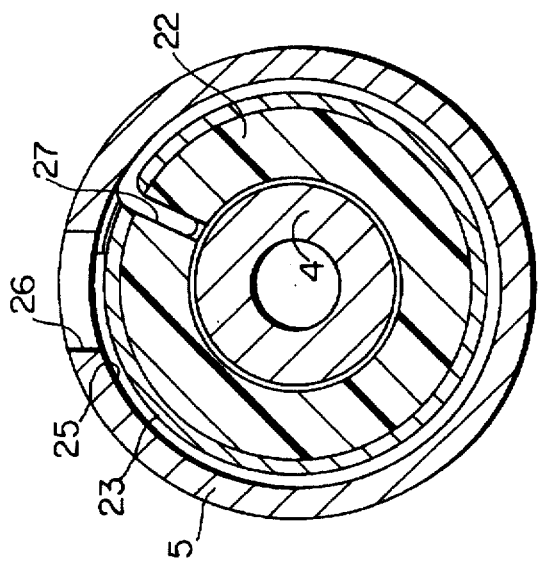
FIG. 5 is a cross-sectional view taken along the line V—V in FIG. 1.
Figure 4:
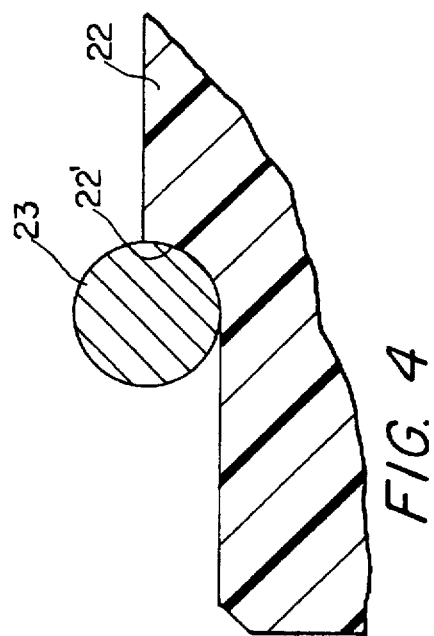
FIG. 4 is an enlarged cross-sectional view showing a main portion of the stopper and a ring member in the embodiment.

An annular stopper 22 is inserted into the housing 5 so as to be positioned external to the bushing 30. A cir-clip (ring member) 23 prevents the stopper 22 from moving outwardly from the housing 5. To be more precise, as shown in FIG. 5, an opening 26 is formed through the housing 5, and a circumferential groove 25 is formed on the inner circumference of the housing 5 so as to be connected with the opening 26. As shown in FIG. 4, a step 22' is formed on the outer circumference of the stopper 4 so that the outer diameter of the stopper 22 at its inward portion extending from the step 22' inwardly is larger than that of the stopper 22 at its outward portion extending from the step 22' outwardly. A fitting hole 27 is formed through the outward portion of the stopper 22. The cir-clip 23 is made of a steel wire. One end of the cir-clip 23 is inserted into the fitting hole 27 through the opening 26, and then the cir-clip 23 is wound by rotating the stopper 22 relative to the housing 5, and thus the cir-clip 23 is engaged with both of the circumferential groove 25 formed on the inner circumference of the housing 5 and the step 22' of the stopper 22. As shown in FIG. 2, plural recesses 22a are formed on the outward side of the stopper 22 for receiving a tool so as to be able to rotate the stopper 22 by the tool. As shown in FIG. 3, plural holes 22b are formed on the inward side of the stopper in order to reduce the weight of the stopper 22.

Since the cir-clip 23 engages with the circumferential groove 25 of the housing 5, the movement of the cir-clip 23 relative to the housing 5 along the axis of the rack 4 is restrained. Thereby, when the cir-clip 23 engages with the step 22' of the stopper 22, the outward movement of the stopper 22 from the housing 5 is restrained. Thereby, the stopper 22 can restrain the bushing 30 from moving outwardly from the housing 5 against hydraulic pressure for the steering assist force. As shown in FIG. 1, there is a clearance t between the bushing 30 and the stopper 22 to assure tolerance for assembly.

The stopper 22 can be made of thermoplastic synthetic resin such as NYLON 66 (Polyhexamethylenadipamide) by injection molding technique. Since the stopper 22 is subjected to high temperature (about 120° C.) of atmosphere and oil, crystalline synthetic resin, which contains filler such as glass fiber, carbon fiber, glass bead, whisker or the like, is preferable as the material of the stopper 22 to increase intensity, heat resistance and oil resistance. However, the stopper 22 is a complex shape having the step 22' and the holes 22b, besides the flowability of the synthetic resin material is reduced when the material contains much filler. Therefore, when such synthetic resin of which flowability is reduced is charged into a die having complex shape for injection molding, the die can not be filled by the material sufficiently, so that the intensity of the stopper 22 is reduced. It is preferable that such material of the stopper 22 is blended with synthetic resin material having a low crystallization rate in order to prevent the reduction of the flowability. When the stopper 22 is made of 67 weight % of NYLON 66 and 33 weight % of glass fiber, breaking strength of the stopper 22 is of 1800 kgf; when the stopper 22 is made of 57 weight % of NYLON 66 and 43 weight % of glass fiber, breaking strength of that is of 2100 kgf; and when the stopper 22 is made of 50 weight % of nylon 66 and 50 weight % of glass fiber, breaking strength of that is of 2300 kgf. While, when the stopper 22 is made of 30 weight % of NYLON 66, 60 weight % of glass fiber, and 10 weight % of NYLON MXD which has a lower crystallization rate than that of NYLON 66, breaking strength of that is of 3200 kgf, because the reduction of the flowability in the injection molding is prevented by the nylon MXD. Further, by adding the NYLON MXD, injection molding is performed easily compared with the case where the NYLON MXD is not added. This shows that addition of both of much glass fiber and synthetic resin which has low crystallization rate as the material of the stopper 22 results in improved breaking strength and easiness of forming of the stopper 22. The stopper 22 may be made of 30 weight % of NYLON 66, 60 weight % of glass fiber, and 10 weight % of PET which has lower crystallization rate than that of NYLON 66. The stopper 22 may be made of 30 weight % of NYLON 66, 60 weight % of glass fiber, and 10 weight % of polycarbonate which has lower crystallization rate than that of NYLON 66.

As shown in FIG. 4, the outer diameter of the stopper 22 at its outward portion extending from the step 22' outwardly is not greater than the inner diameter of the cir-clip 23. Although one end of the cir-clip 23 is inserted into the fitting hole 27 of the stopper 22, the part of the cir-clip 23 inserted into the fitting hole 27 is flexible relative to the remaining part of the cir-clip 23. Therefore, the stopper 22 is allowed to move inwardly into the housing 5 relative to the cir-clip 23. The inward movement of the stopper 5 into the housing 5 is restrained via the bushing 30, because the engagement between both of the steps 5' and 30' restrains the bushing 30 from moving into the housing 5. In other words, a reaction force, which supports the stopper 22 so as to restrain the stopper 22 from moving inwardly into the housing 5, can be exerted on the inward end face 22c of the stopper 22 facing the bushing 30.

Since the stopper 22 is restrained from moving inwardly into the housing 5, one 6 of said two ball joints 6, 7 is restrained from moving inwardly into the housing 5 when the ball joint 6 is received by the stopper 22. Thereby, the stopper 22 restrains the rack 4 from moving into one direction (into the right in FIG. 6) along the axis of the rack 4, so that the angle of steering to the one direction is prevented from going to excess.

Figure 7:
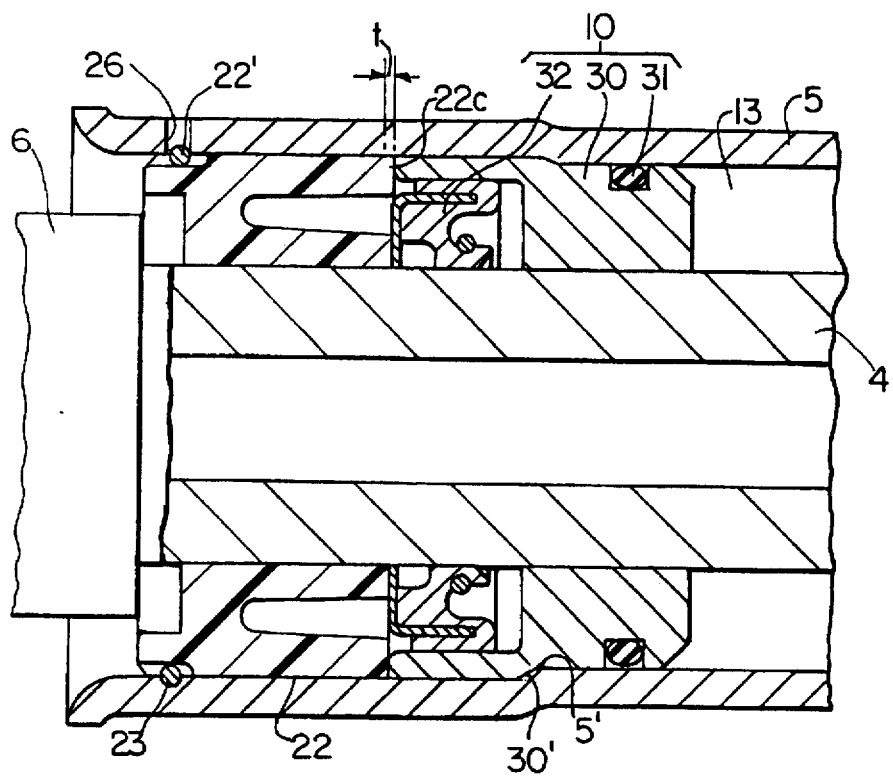
FIG. 7 is a cross-sectional view showing the stopper mounting portion, wherein a movement of a rack of the steering device into one direction is restrained.

As shown in FIG. 7, to restrain the movement of the rack 4 into the one direction by the stopper 22 when for example the vehicle wheel runs over to a curb or the like, the stopper 22 receiving the ball joint 6 moves inwardly into the housing 5 to close said clearance t in the first place, so that the inward end face 22c of the stopper 22 facing the bushing 30 is engaged with the bushing 30. Next, both of the stopper 22 and the bushing 30 move inwardly into the housing 5 until the step 30' of the bushing 30 is engaged with the step 5' of the housing 5, and thus the reaction force, which restrains the rack 4 from moving in the one direction, arises. Since all of the reaction force acts on the end face 22c of the stopper 22 without acting on the stopper 22 via the cir-clip 23, fracture of the stopper 22 is prevented, compared with the prior art in which all of the reaction force acts on the circumferential groove formed on the outer circumference of the stopper and stress concentration is increased at the circumferential groove.

When the outward movement of the bushing 30 from the housing 5 is restrained by the stopper 22, a reaction force acts on the step 22' formed on the outer circumference of the stopper 22 against the force, which arises based on the steering assist hydraulic pressure acting on the bushing 30 to move it outwardly from the housing 5. The force based on the hydraulic pressure to move the bushing 30 outwardly from the housing 5 is smaller than the force, which is transmitted from the road via the vehicle wheel to move the rack 4 into the one direction when for example the vehicle wheel runs over to a curb or the like. Thereby, the reaction force acting on the step 22' based on the hydraulic pressure is too small to fracture the stopper 22.

As shown in FIG. 6, the housing 5 has a step 5c formed on the inner circumference of the housing 5 in the vicinity of the other 5b of the openings 5a, 5b. When the other 7 of said two ball joints 6, 7 is received by the step 5c, the ball joint 7 is prevented from moving inwardly into the housing 5. Thereby, the rack 4 is restrained from moving into the other direction (into the left in FIG. 6) along the axis of the rack 4, so that the angle of steering to the other direction is prevented from going to excess.

ALTERNATE EMBODIMENT 1

Figure 8:
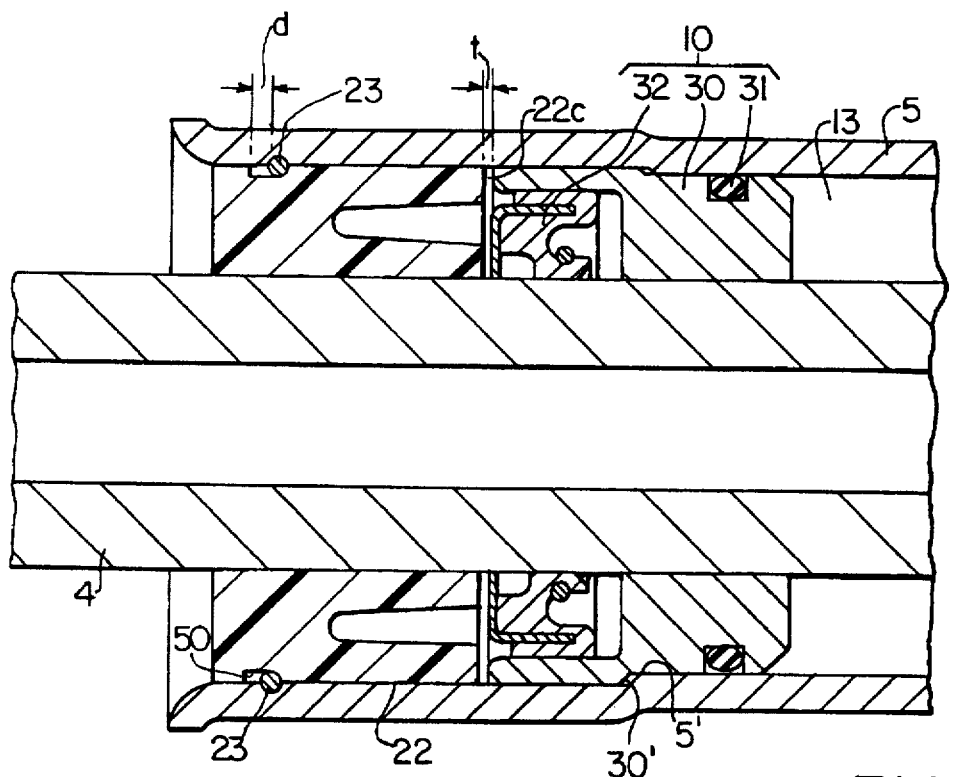
FIG. 8 is a cross-sectional view showing a stopper mounting portion of a steering device in an alternate embodiment 1 according to the present invention.

FIG. 8 shows a first alternate embodiment. Differences between this alternate embodiment and the above embodiment are as follows. A circumferential groove 50 is formed on the outer circumference of the stopper 22, and the cir-clip 23 is engaged with a step 22' defined by the circumferential groove 50 in order to restrain the stopper 22 from moving outwardly from the housing 5. The width of the groove 50 is set larger than the width of the cir-clip 23 in the direction of the axis of the rack 4, in order that the cir-clip 23 does not engage with the groove 50 when the stopper 22 restrains the rack 4 from moving in the one direction 5. In other words, a distance d between the cir-clip 23 and the outward side of the groove 50 is set larger than at least the clearance t between the bushing 30 and the stopper 22, in order that the inward end face 22c of the stopper 22 is supported via the bushing 30 without engaging the cir-clip 23 with the outward side of the groove 50. Therefore, all of the reaction force restraining the rack 4 from moving into the one direction acts on the inward end face 22c of the stopper 22 without acting on the circumferential groove 50, so that fracture of the stopper 22 is prevented.

ALTERNATE EMBODIMENT 2

Figure 9A:
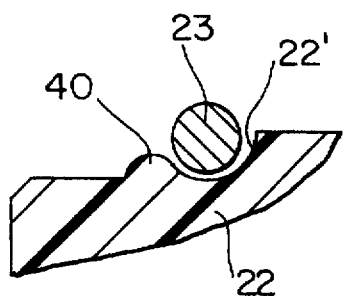
FIG. 9A and FIG. 9B are enlarged cross-sectional views showing a main portion of a stopper and a ring member of a steering device in an alternate embodiment 2 according to the present invention.
Figure 9B:
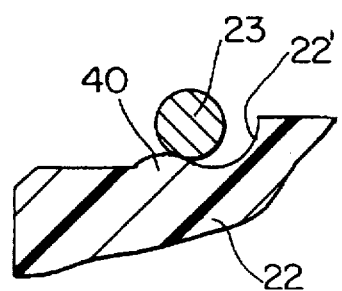

FIG. 9A and FIG. 9B show a second alternate embodiment of the present invention. Differences between this alternate embodiment and the above embodiment are as follows. A circular projected portion 40 is formed on the outer circumference of the stopper 22 so as to be positioned in the outward area extending from the step 22' outwardly. The outer diameter of the projected portion 40 is set smaller than the outer diameter of the inward area of the stopper 22, wherein the inward area extends from the step 22' inwardly. Normally, as shown in FIG. 9A, the cir-clip 23 is positioned between the step 22' and the projected portion 40, and thus the stopper 22 is restrained from becoming unsteady along the axis of the rack 4. When the stopper 22 is restrained from moving outwardly from the housing 5, the cir-clip 23 is engaged with the step 22' as same as the above embodiment. When the stopper 22 is restrained from moving into the housing 5, as shown in FIG. 9B, the projected portion 40 is pressed by the cir-clip 23 so as to deform elastically. Then the stopper 22 moves inwardly into the housing 5 until the end face 22c of the stopper 22 is supported via the bushing 30. Thereby, the reaction force restraining the rack 4 from moving into the one direction acts not only on the end face 22c but also on the projected portion 40, so that the reaction force is distributed. Further, part of the reaction force is absorbed by the elastic deformation of the projected portion 40. Thus fracture of the stopper 22 is prevented certainly.

ALTERNATE EMBODIMENT 3

Figure 10A:
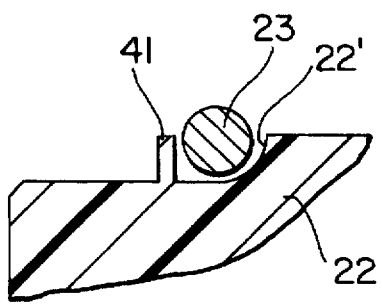
FIG. 10A and FIG. 10B are enlarged cross-sectional views showing a main portion of a stopper and a ring member of a steering device in an alternate embodiment 3 according to the present invention.
Figure 10B:
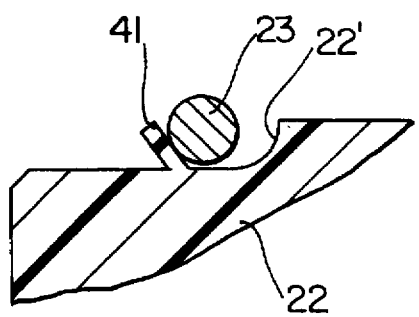

FIG. 10A and FIG. 10B show a third alternate embodiment of the present invention. Differences between this alternate embodiment and the above embodiment are as follows. A circular projected wall 41 is formed on the outer circumference of the stopper 22 so as to be positioned in the outward area extending from the step 22' outwardly. The outer diameter of the projected wall 41 is equal to the outer diameter of the inward area of the stopper 22, wherein the inward area extends from the step 22' inwardly. The width of the projected wall 41 in the direction of the axis of the rack 4 is thin enough to be deformable elastically along the axis of the rack 4. Normally, as shown in FIG. 10A, the cir-clip 23 is positioned between the step 22' and the projected wall 41, and thus the stopper 22 is restrained from moving in shaky along the axis of the rack 4. When the stopper 22 is restrained from moving outwardly from the housing 5, the cir-clip 23 is engaged with the step 22' as same as the above embodiment. When the stopper 22 is restrained from moving into the housing 5, as shown in FIG. 10B, the projected wall 41 is pressed by the cir-clip 23 so as to deform elastically. Then the stopper 22 moves inwardly into the housing 5 until the end face 22c of the stopper 22 is supported via the bushing 30. Thereby, the reaction force restraining the rack 4 from moving in the one direction acts not only on the inward end face 22c of the stopper 22 but also on the projected wall 41, so that the reaction force is distributed. Further, part of the reaction force is absorbed by the elastic deformation of the projected wall 41. Thus fracture of the stopper 22 is prevented certainly.

ALTERNATE EMBODIMENT 4

Figure 11:
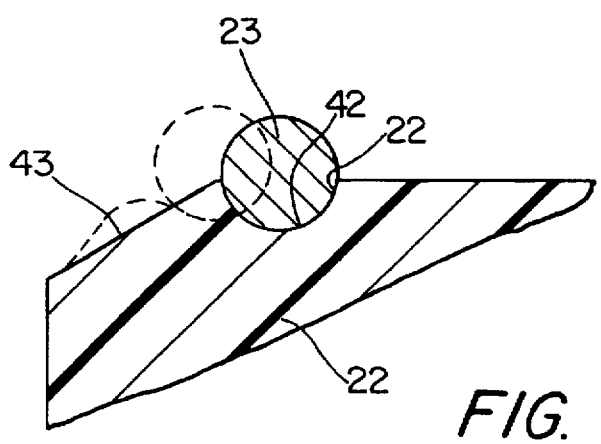
FIG. 11 is an enlarged cross-sectional view showing a main portion of a stopper and a ring member of a steering device in an alternate embodiment 4 according to the present invention.

FIG. 11 shows a fourth alternate embodiment of the present invention. Differences between this alternate embodiment and the above embodiment are as follows. A circumferential groove 42 is formed on the outer circumference of the stopper 22. The cir-clip 23 is engaged with a step 22' defined by the circumferential groove 42 so that the stopper 22 is restrained from moving outwardly from the housing 5. In the outward area extending from the groove 42 outwardly, the outer circumference of the stopper 22 is tapered conical surface 43. Normally, the cir-clip 23 is positioned in the groove 42, and thus the stopper 22 is restrained from becoming unsteady along the axis of the rack 4. When the stopper 22 is restrained from moving into the housing 5, as shown by the broken line, the conical surface 43 is pressed by the cir-clip 23 so as to deform elastically. Then, the stopper 22 moves inwardly into the housing 5 until the inward end face 22c of the stopper 22 is supported via the bushing 30. Thereby, the reaction force restraining the rack 4 from moving into the one direction acts not only on the end face 22c but also on the conical surface 43, so that the reaction force is distributed. Further, part of the reaction force is absorbed by the elastic deformation of the conical surface 43. Thus fracture of the stopper 22 is prevented certainly.

ALTERNATE EMBODIMENT 5

Figure 12:
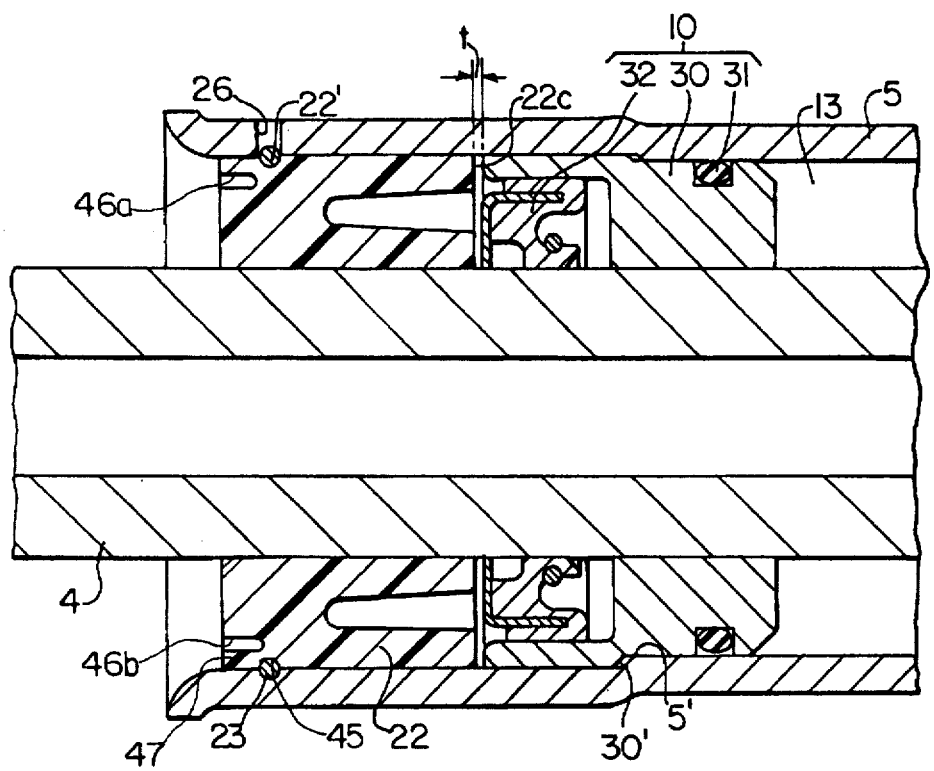
FIG. 12 is a cross-sectional view showing a stopper mounting portion of a steering device in an alternate embodiment 5 according to the present invention.
Figure 13:
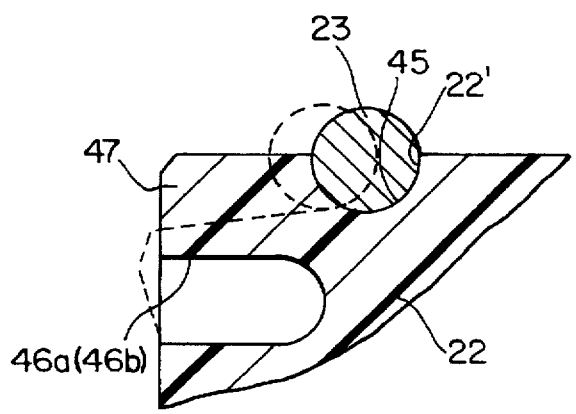
FIG. 13 is an enlarged cross-sectional view showing a main portion of the stopper and a ring member in the alternative embodiment 5.
Figure 14:
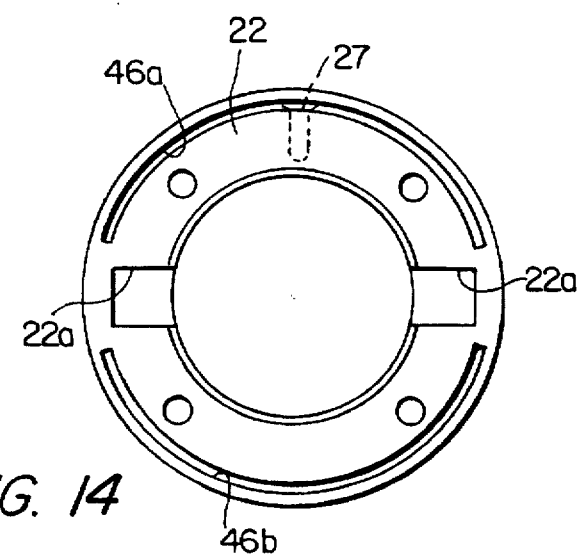
FIG. 14 is a front view showing the stopper in the alternate embodiment 5.

FIGS. 12 through 14 show a fifth alternate embodiment of the present invention. Differences between this alternate embodiment and the above embodiment are as follows. A circumferential groove 45 is formed on the outer circumference of the stopper 22. The cir-clip 23 is engaged with a step 22' defined by the circumferential groove 45 so that the stopper 22 is restrained from moving outwardly from the housing 5. As shown in FIG. 14, a pair of grooves 46a, 46b, each of which looks like an arc shape in a front view, are formed on the outward end face of the stopper 22 in the vicinity of the circumferential groove 45. Normally, as shown by the solid line in FIG. 13, the cir-clip 23 is positioned in the circumferential groove 45, and thus the stopper 22 is restrained from becoming unsteady along the axis of the rack 4. When the stopper 22 is restrained from moving into the housing 5, as shown by the broken line in FIG. 13, the outer area 47 surrounding the grooves 46a, 46b is pressed toward radially inward directions by the cir-clip 23 so as to deform elastically. Then, the stopper 22 moves inwardly into the housing 5 until the inward end face 22c of the stopper 22 is supported via the bushing 30. Thereby, the reaction force restraining the rack 4 from moving into the one direction acts not only on the inward end face 22c of the stopper 22 but also on the outer area 47 surrounding the grooves 46a, 46b, so that the reaction force is distributed. Further, part of the reaction force is absorbed by the elastic deformation of the outer area 47. Thus fracture of the stopper 22 is prevented certainly.

ALTERNATE EMBODIMENT 6

Figure 15A:
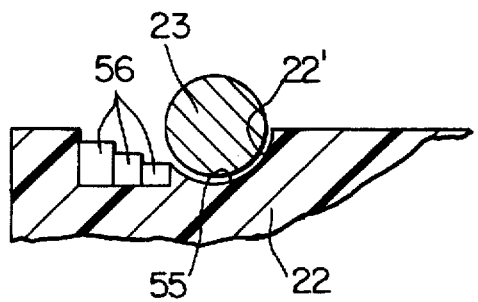
FIG. 15A is an enlarged cross-sectional view showing a main portion of a stopper and a ring member of a steering device in an alternate embodiment 6 according to the present invention.
Figure 15B:
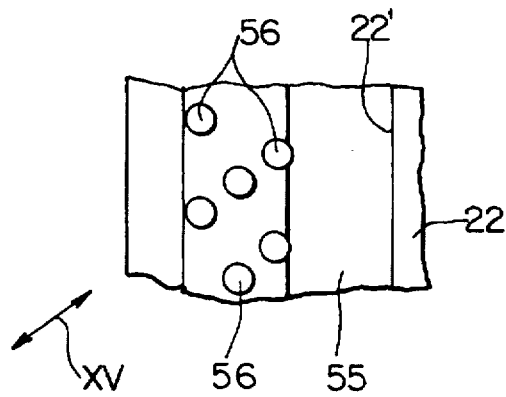
FIG. 15B is an enlarged plan view showing the main portion of the stopper in the alternate embodiment 6.

FIG. 15A and FIG. 15B show a sixth alternate embodiment of the present invention. Differences between this alternate embodiment and the above embodiment are as follows. A circumferential groove 55 is formed on the outer circumference of the stopper 22. The cir-clip 23 is engaged with a step 22' defined by the circumferential groove 55 so that the stopper 22 is restrained from moving outwardly from the housing 5. In the outward area extending from the circumferential groove 55 outwardly, many columns 56 are formed on the outer circumference of the stopper 22. The columns 56 are lined up by three along a direction inclined to the axis of the rack 4 (along the direction of an arrow XV in FIG. 15B). The heights of the three columns 56 in the each line is stepped up as it 56 run to outward from the housing 5. Normally, the cir-clip 23 is positioned in the circumferential groove 55, and thus the stopper 22 is restrained from becoming unsteady along the axis of the rack 4. When the stopper 22 is restrained from moving into the housings, each column is pressed by the cir-clip 23 so as to deform elastically. Then, the stopper 22 moves inwardly into the housing 5 until the inward end face 22c of the stopper 22 is supported via the bushing 30. Thereby, the reaction force restraining the rack 4 from moving into the one direction acts not only on the inward end face 22c of the stopper 22 but also on the columns 56, so that the reaction force is distributed. Further, part of the reaction force is absorbed by the elastic deformation of the columns 56. Thus fracture of the stopper 22 is prevented certainly.

ALTERNATE EMBODIMENT 7

Figure 16A:
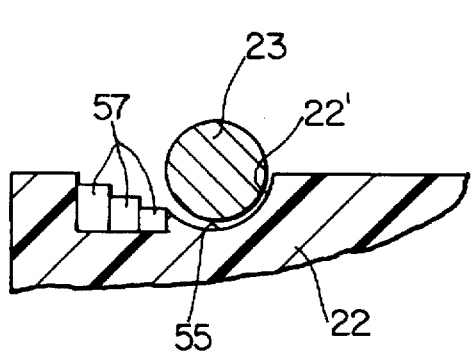
FIG. 16A is an enlarged cross-sectional view showing a main portion of a stopper and a ring member of a steering device in an alternate embodiment 7 according to the present invention.
Figure 16B:
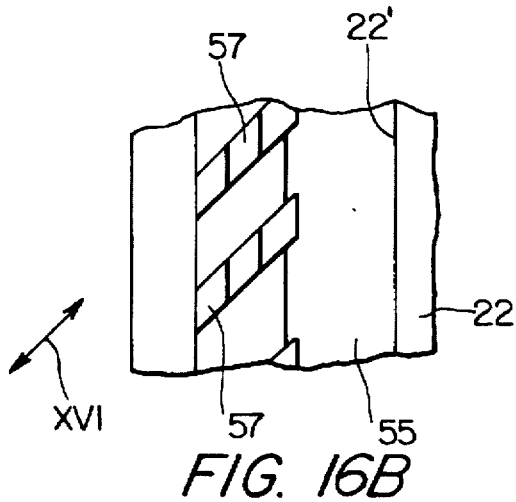
FIG. 16B is an enlarged plan view showing the main portion of the stopper in the alternate embodiment 7.

FIG. 16A and FIG. 16B show a seventh alternate embodiment of the present invention. Differences between the above alternate embodiment 6 and this alternate embodiment 7 are as follows. Instead of the columns 56, a plurality of stepwise portions 57, each of which is arranged along a direction inclined to the axis of the rack 4 (in the direction of the arrow XVI in FIG. 16B), are formed. The height of each stepwise portion 57 is stepped up as it 57 runs to outward from the housing 5. The rest of the construction of this seventh alternate embodiment remains unchanged from the sixth alternate embodiment. This seventh alternative embodiment offers the advantage identical to that of the sixth alternate embodiment.

ALTERNATE EMBODIMENT 8

Figure 17A:
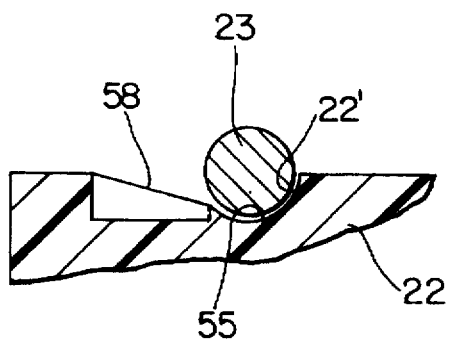
FIG. 17A is an enlarged cross-sectional view showing a main portion of a stopper and a ring member of a steering device in an alternate embodiment 8 according to the present invention.
Figure 17B:
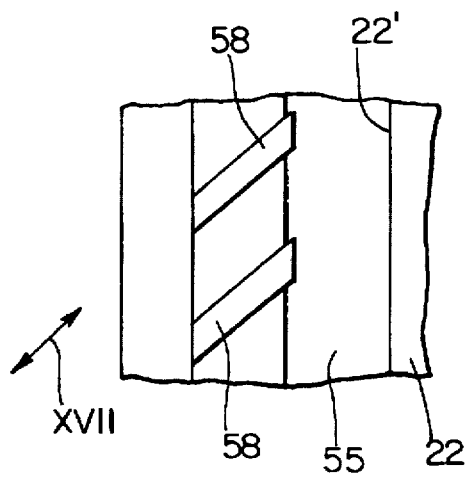
FIG. 17B is an enlarged plan view showing the main portion of the stopper in the alternate embodiment 8.

FIG. 17A and FIG. 17B show an eighth alternate embodiment of the present invention. The differences between the above alternate embodiment 6 and this alternate embodiment 8 are as follows. Instead of the columns 56, a plurality of ramps 58, each of which is arranged along a direction inclined to the axis of the rack 4 (in the direction of the arrow XVII in FIG. 17B), are formed. The height of each ramp 58 is increased as it 58 runs to outward from the housing 5. The remainder of the construction of this eighth alternate embodiment remains unchanged from the sixth alternate embodiment. This eighth alternative embodiment offers the advantage identical to that of the sixth alternate embodiment.

COMPARATIVE EMBODIMENT

Figure 18:
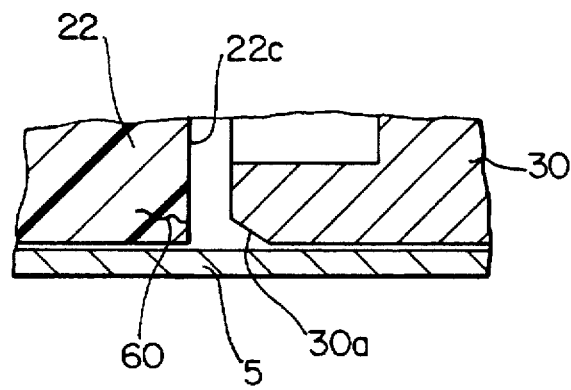
FIG. 18 is an enlarged cross-sectional view showing a stopper, a bushing, and a housing in a comparative embodiment against the present invention.

FIG. 18 shows a comparative embodiment of the present invention. In the above embodiments, when the stopper 22 restrains the rack 4 from moving into the one direction, the inward end face 22c of the stopper 22 is engaged with the bushing 30. The bushing 30 has a chamfer 30a on its outward end face facing the stopper 22 in order to smoothly insert the bushing 30 into the housing 5 and pull out the bushing 30 from the housing 5. If the inward end face 22c of the stopper 22 facing the bushing 30 is flat as shown in FIG. 18, the edge of the stopper 22 enters into the space between the chamfer 30a and the housing by plastic deformation 5 when the inward end face 22c is supported via the bushing 30. Therefore, there is a possibility to generate a crack 60 causing a fracture of the stopper 22.

ALTERNATE EMBODIMENT 9

Figure 19A:
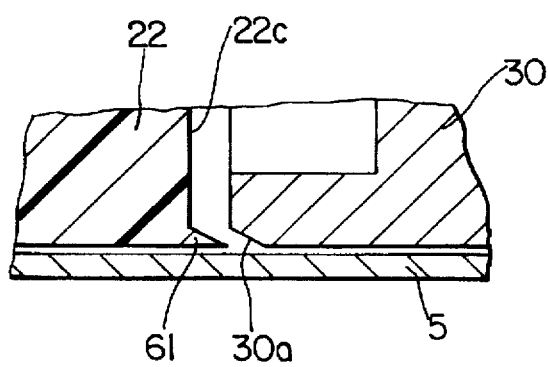
FIG. 19A is an enlarged cross-sectional view showing a main portion of a stopper, a bushing, and a housing in an alternate embodiment 9 according to the present invention.

FIG. 19A shows a ninth alternate embodiment of the present invention. Differences between the above comparative embodiment and this alternate embodiment is as follows. the stopper 22 has a circular projection 61 integrally formed on its inward end face 22c facing the bushing 30. The shape of the projection 61 correspond to the shape of the space between the chamfer 30a of the bushing 30 and the housing 5. The circular projection 61 fills the space between the chamfer 30a and the housing 5 when the inward movement of the stopper 22 into the housing 5 is restrained via the bushing 30, so that the edge of the stopper 22 is prevented from entering the space by the plastic deformation. This avoids fracture of the stopper 22.

ALTERNATE EMBODIMENT 10

Figure 19B:
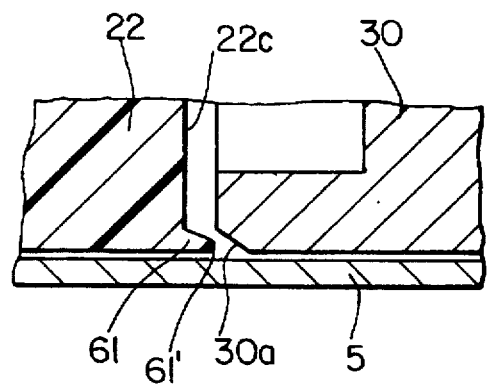
FIG. 19B is an enlarged cross-sectional view showing a main portion of a stopper, a bushing, and a housing in an alternate embodiment 10 according to the present invention.

FIG. 19B shows a tenth alternate embodiment of the present invention. Differences between this alternate embodiment and the above ninth embodiment are as follows. The point of the circular projection 61 is a curved surface 61', of which radius is for example of R=0.5 mm. The remainder of the construction of this alternate embodiment remains unchanged from the above alternate embodiment 9 and offers the advantage identical to that of alternate embodiment 9.

ALTERNATE EMBODIMENT 11

Figure 19C:
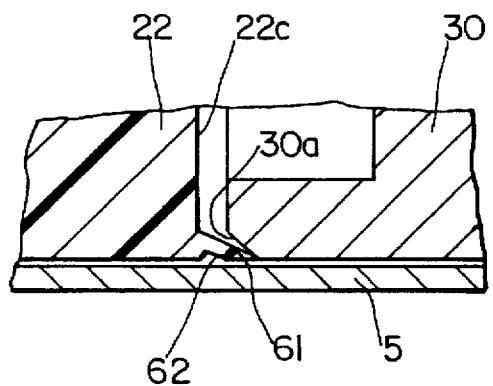
FIG. 19C is an enlarged cross-sectional view showing a main portion of a stopper, a bushing, and a housing in an alternate embodiment 11 according to the present invention.

FIG. 19C shows an eleventh alternate embodiment of the present invention. Differences between this alternate embodiment and the ninth alternate embodiment are as follows. A circular cutout 62 is formed in the circular projection 61. The cutout 62 helps the circular projection 61 to deform elastically by load which arises when the circular projection 61 fills the space between the chamfer 30a and the housing 5. This arrangement prevents the circular projection 61 from fracture. The remainder of the construction of this alternate embodiment remains unchanged from the ninth alternate embodiment and offers the advantage identical to that of the ninth alternate embodiment.

ALTERNATE EMBODIMENT 12

Figure 20:
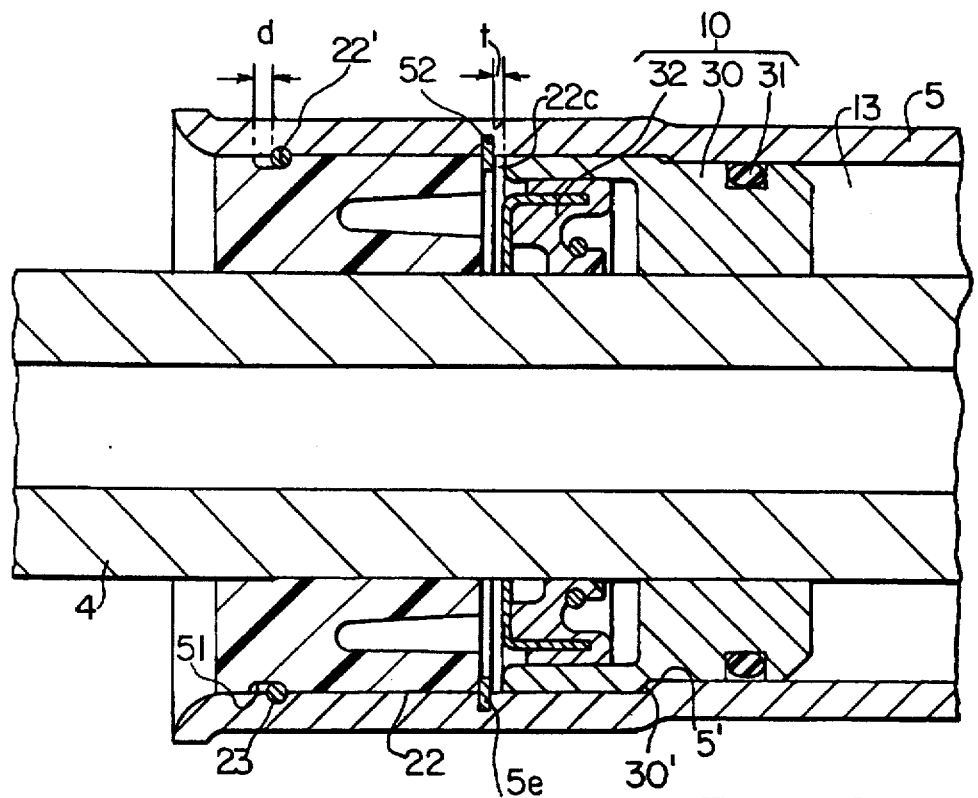
FIG. 20 is a cross-sectional view showing a stopper mounting portion of a steering device in an alternate embodiment 12 according to the present invention.

FIG. 20 shows a twelfth alternate embodiment of the present invention. Differences between this alternate embodiment and the above embodiment are as follows. A circumferential groove 51 is formed on the outer circumference of the stopper 22. The cir-clip 23 is engaged with a step 22' defined by the circumferential groove 51 so that the stopper 22 is restrained from moving outwardly from the housing 5. A circumferential groove 5e is formed on the inner circumference of the housing 5, and a C type retaining ring 52 is fitted into the circumferential groove 5e so as to be positioned between the stopper 22 and the bushing 30. A clearance t is allowed between the C type retaining ring 52 and the outward end face of the bushing 30 to assure tolerance for assembly. The C type retaining ring 52 restrains the bushing 30 from moving outwardly from the housing 5. The width of the circumferential groove 51 is set larger than the width of the cir-clip 23 in the direction of the axis of the rack 4 so that the cir-clip 23 is engaged with the circumferential groove 51 after the C type retaining ring 52 is engaged with the inward end face 22c of the stopper 22 when the stopper 22 restrains the rack 4 from moving into the one direction. As mentioned below, the distance d between the cir-clip 23 and the outward side of the groove 51 is set so that the stopper 22 is not fractured when the inward movement of the rack 4 into the one direction is restrained by the stopper 22. The remainder of the construction of this twelfth alternate embodiment remains unchanged from the above embodiment.

Figure 21A:
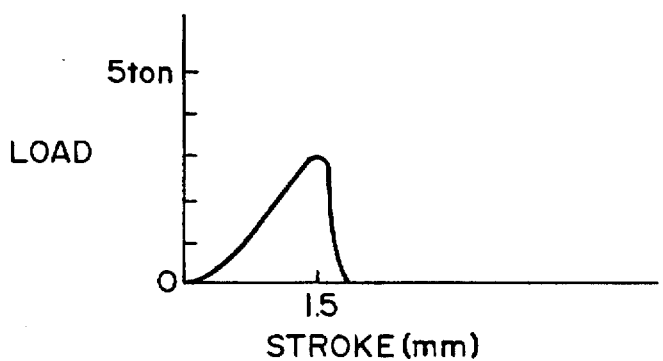
FIG. 21A shows a relationship between stroke of a rack and load acting on a stopper in the comparative embodiment.
Figure 22:
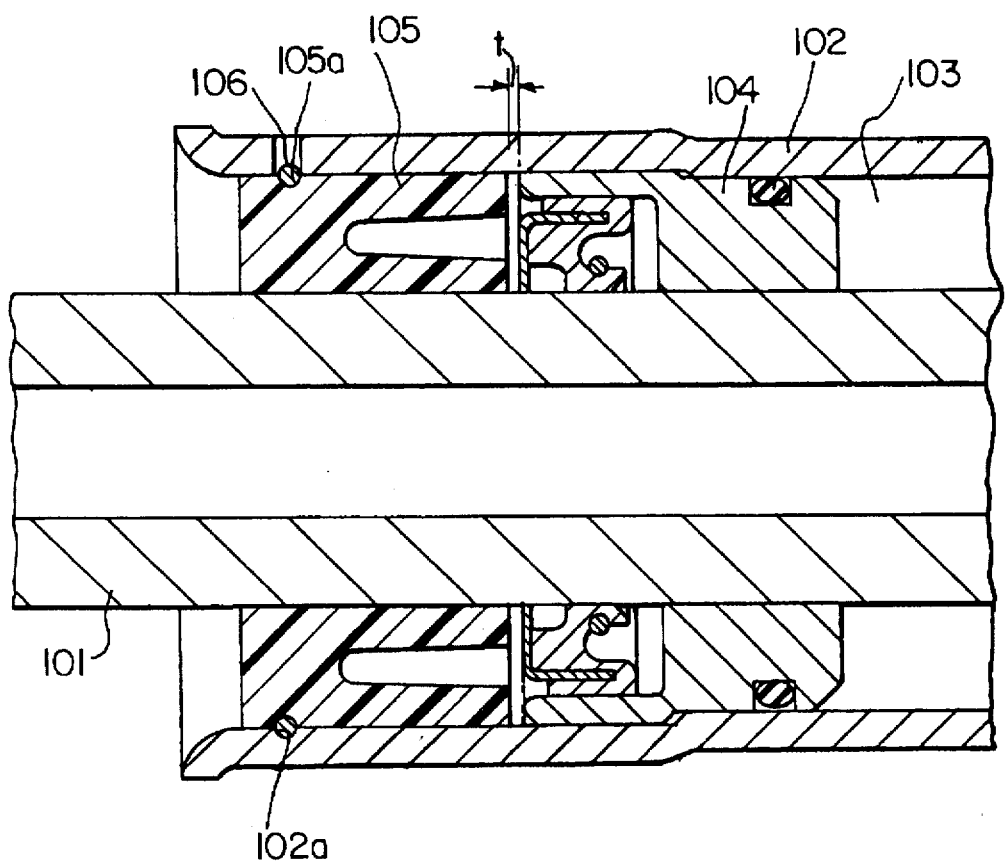
FIG. 22 is a cross-sectional view showing a stopper mounting portion in a conventional power steering device.
Figure 23:
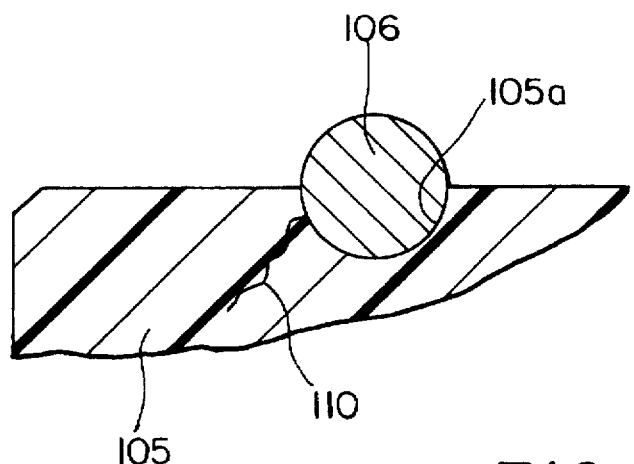
FIG. 23 is an enlarged cross-sectional view showing the stopper and a ring member in the conventional steering device.

FIG. 21A shows the relationship between the stroke of the rack 101 and the load exerted on the stopper 105, wherein the inward movement of the stopper 105 into the housing 102 is restrained only by the engagement of the cir-clip 106 with the circumferential groove 105a as shown in FIG. 22, and the stopper 105 is made of synthetic resin. The plotting in FIG. 21A starts at the initiation of the restraining of the movement of the stopper 105. As seen from FIG. 21A, the stopper 105 is fractured under a load less than 4 tons when the stroke of the rack 101 is of 1.5 mm.

Figure 21B:
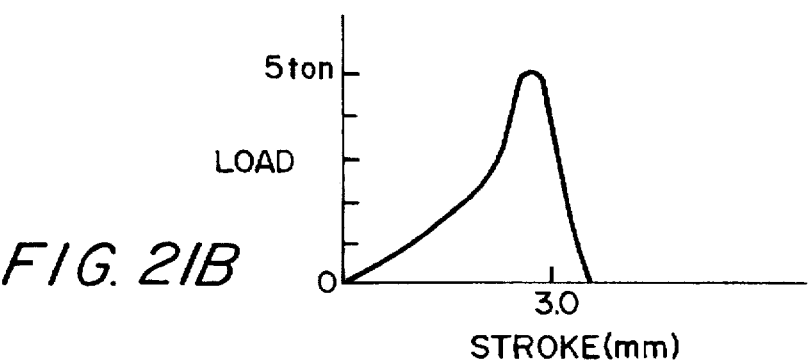
FIG. 21B shows a relationship between stroke of a rack and load acting on the stopper in the alternate embodiment 12.

FIG. 21B shows the relationship between the stroke of the rack 4 and the load exerted on the stopper 22, wherein the inward movement of the stopper 22 into the housing 5 is restrained by the engagement of the C type retaining ring 52 with the inward end face 22c of the stopper 22 and by the subsequent engagement of the cir-clip 23 with the circumferential groove 51 as shown in FIG. 20. The plotting in FIG. 21B starts at the initiation of the restraining of the movement of the stopper 22. The distance d between the cir-clip 23 and the outward side of the circumferential groove 51 is set to 1.5 mm. FIG. 21B shows that the stopper 22 is fractured under a load more than 5 tons when the stroke of the rack 4 is of 3 mm. To be more precise, when the stroke range of the rack 4 is under 1.5 mm, the reaction force restraining the movement of the stopper 22 acts on the inward end face 22c of the stopper 22 via the C type retaining ring 52. When the stroke range of the rack 4 is beyond 1.5 mm, the reaction force restraining the movement of the stopper 22 acts not only on the inward end face 22c via the retaining ring 52 but also on the outward side of the circumferential groove 51 via the cir-clip 23. Thereby, the reaction force acting on the stopper 22 is distributed, and the stopper 22 withstands a larger load and is prevented from fracture.

The present invention is not limited to the embodiment and alternate embodiments. In the above embodiments, the movement of the rack 4 into the one direction 5 is restrained by engaging the ball joint 6 with the stopper 22. Alternatively, a member integrally formed with the rack 4, other than the ball joint 6, may be used to restrain the movement of the rack 4.

What is claimed is:

1. A rack and pinion steering device comprising:

a rack meshing with a pinion which rotates according to a steering operation;

a housing containing the rack;

an annular stopper made of synthetic resin, the stopper having an end face and the stopper being inserted into the housing;

means for enabling a reaction force to act on the stopper so that the inward movement of the stopper into the housing is restrained;

a ring member engaged with both of the stopper and the housing to restrain the stopper from moving outwardly from the housing and inwardly into the housing;

a retaining ring fitted to the housing to restrain the stopper from moving inwardly into the housing; and a circumferential groove formed on the outer circumference of the stopper;

wherein at least part of the reaction force acts on the end face of the stopper when the stopper restrains the rack from moving in one direction; and wherein the width of the circumferential groove is set larger than the width of the ring member in the direction of the axis of the rack so that the ring member is engaged with the circumferential groove after the retaining ring is engaged with the end face of the stopper to restrain the stopper from moving inwardly into the housing.

2. A rack and pinion steering device comprising:

a rack meshing with a pinion which rotates according to a steering operation, the rack having an axis;

a housing containing the rack;

an annular stopper made of synthetic resin, the stopper having an outer circumference, a groove, a step formed on the outer circumference defined at least in part by the groove, and an elastically deformable portion formed on the outer circumference, the elastically deformable portion projecting outwardly from the groove to be more elastically deformable than the step, and the stopper being inserted into the housing along the axis of the rack;

means for enabling a reaction force to act on the stopper so that the inward movement of the stopper into the housing is restrained; and a ring member engaged with both the housing and the step to prevent the stopper from moving outwardly from the housing, the elastically deformable portion of the stopper being pressed by the ring member so as to deform elastically when the inward movement of the stopper into the housing is restrained, and the ring member being positioned between the step and the elastically deformable portion formed on the outer circumference of the stopper to restrain the stopper from movement along the axis of the rack.

3. A rack and pinion steering device comprising:

a rack meshing with a pinion which rotates according to a steering operation, the rack having an axis;

a housing containing the rack, the housing having an inner circumference and a step formed on its inner circumference;

an annular stopper made of synthetic resin, the stopper having an outer circumference, a step formed on the outer circumference, and an elastically deformable portion formed on the outer circumference, the stopper being inserted into the housing along the axis of the rack;

means for enabling a reaction force to act on the stopper so that the inward movement of the stopper into the housing is restrained;

a ring member engaged with both the housing and the step to prevent the stopper from moving outwardly from the housing, the elastically deformable portion of the stopper being pressed by the ting member so as to deform elastically when the inward movement of the stopper into the housing is restrained, and the ring member being positioned between the step and the portion formed on the outer circumference of the stopper to restrain the stopper from movement along the axis of the rack; and a bushing inserted into the housing to support the rack, the bushing having an end face, an outer circumference, a step formed on the outer circumference, and a chamfer on its end face which faces the stopper and is spaced from the housing;

wherein:

the stopper is inserted into the housing so as to be positioned external to the bushing and has a projection on its end face which faces the bushing;

the inward movement of the bushing into the housing is restrained by the engagement between both of the steps so that the stopper is restrained from moving inwardly into the housing via the bushing; and the space between the chamfer and the housing is filled by the projection when the inward movement of the stopper into the housing is restrained via the bushing.

* * * * *